US007419704B2

United States Patent
Passman et al.

(10) Patent No.: US 7,419,704 B2
(45) Date of Patent: Sep. 2, 2008

(54) COATINGS ON FIBER REINFORCED COMPOSITES

(75) Inventors: Richard Kent Passman, Westfield, IN (US); David A. McPherson, Greenwood, IN (US)

(73) Assignee: Praxair S. T. Technology, Inc., North Haven, CT (US)

( * ) Notice: Subject to any disclaimer, the term of this patent is extended or adjusted under 35 U.S.C. 154(b) by 409 days.

(21) Appl. No.: 11/206,148

(22) Filed: Aug. 18, 2005

(65) Prior Publication Data
US 2007/0042126 A1 Feb. 22, 2007

(51) Int. Cl.
*B05D 1/08* (2006.01)
(52) U.S. Cl. .................. 427/446; 427/442; 427/427.5
(58) Field of Classification Search .......... 427/446, 427/422, 427.5
See application file for complete search history.

(56) References Cited

U.S. PATENT DOCUMENTS

| | | | | | |
|---|---|---|---|---|---|
| 3,698,053 | A | * | 10/1972 | Hess et al. | 29/132 |
| 4,301,583 | A | | 11/1981 | Poole | 29/121.2 |
| 4,301,730 | A | | 11/1981 | Heurich et al. | 101/348 |
| 5,296,582 | A | * | 3/1994 | Fujita et al. | 528/27 |
| 5,324,248 | A | * | 6/1994 | Quigley | 492/50 |
| 5,637,179 | A | * | 6/1997 | Nakayama et al. | 156/330 |
| 5,745,816 | A | | 4/1998 | Verlinden et al. | 396/614 |
| 5,840,386 | A | | 11/1998 | Hatch et al. | 428/36.9 |
| 5,857,950 | A | | 1/1999 | Hycner | 492/30 |

FOREIGN PATENT DOCUMENTS

| | | |
|---|---|---|
| CA | 2066149 | 11/1992 |
| EP | 287002 | 4/1998 |
| WO | WO96/05370 | 2/1996 |

OTHER PUBLICATIONS

Lugscheider et al., The Coating of Carbon Fibre Reinforced Composite (CCC)—Research, Development, Construction and Production, $2^{nd}$ Plasma-Technik-Symposium, vol. 3 (1991) pp. 115-124.
Lugscheider et al., "Mechanical Properties of Thermal Sprayed Coatings on CFRP", Proceedings of the 1993 National Thermal Spray Conference, Anaheim, CA (1993) pp. 569-573.
Tucker, Jr., "Advanced Thermal Spray Deposition Techniques", Handbook of Deposition Technologies for Films and Coatings (1994) pp. 591-642.
Tucker, Jr., "Thermal Spray Coatings", Handbook of Thin Films Process Technology (1995) pp. 497-509.
Handbook of "Thin Film Process Technology", Institute of Physics Publishing, Ltd., London (1995).

\* cited by examiner

*Primary Examiner*—Alain L Bashore
(74) *Attorney, Agent, or Firm*—Gerald L. Coon

(57) ABSTRACT

The invention is a coating and a method for applying coatings to fiber reinforced composite materials. A first polymeric layer, free of fibers and particulate, coats a fiber reinforced polymer substrate. The first layer joins the fiber reinforced polymer substrate to a second polymeric layer. The second polymeric layer contains a polymeric matrix and a particulate within the polymeric matrix. Finally, at least one thermally sprayed material coats the second polymeric layer to form an adherent multi-layer coating attached to the fiber reinforced.

16 Claims, No Drawings

COATINGS ON FIBER REINFORCED COMPOSITES

RELATED APPLICATION

This application claims the benefit of U.S. patent application Ser. No. 09/507,769, filed Feb. 18, 2000, the entire teachings of which are incorporated herein by reference.

FIELD OF THE INVENTION

This invention relates to thermal spray coatings for fiber reinforced polymeric composites. This invention also relates to a process for producing the coatings and to articles of manufacture having fiber reinforced polymeric composite components with the coatings.

BACKGROUND OF THE INVENTION

Fiber reinforced composite materials with polymeric matrices (FRP) including carbon fiber reinforced polymers (CFRP) can be designed and constructed that have outstanding mechanical and physical properties such as low density, high tensile and torsional strength, and high modulus of elasticity or stiffness. A variety of high strength fiber materials can be used including carbon fibers, glass fibers, silicon carbide fibers, and fibers of many other oxides, carbides, and other materials. Similarly, a wide variety of polymeric materials can be used including thermosetting resins such as phenolic resins, epoxies, and many others. The fibers may be very long and positioned in specific patterns or relatively short and randomly dispersed. When long fibers are positioned in specific patterns, they can be aligned in a single direction or positioned in patterns designed to give two or three dimensional strength to the FRP. Thus the mechanical properties of the FRP structure can be tailored to the specific requirements of a component.

Unfortunately, the surfaces of a FRP have low resistance to wear including adhesive, abrasive, and erosive wear. They may also be susceptible to oxidation or other forms of corrosion, need protection from heat, not have the required optical or electrical characteristics, etc. As a result, their utilization has been limited in many applications or has required the use of metallic or ceramic inserts or sleeves in areas of contact or exposure to wear, heat, etc. For example, a bulky and expensive wear resistant sleeve must be bonded to a FRP shaft in bearing areas to prevent adhesive or abrasive wear and FRP aircraft wing or tail components must have a metallic shield bonded on leading edges to prevent erosion. If the large rolls used in paper manufacturing and printing industries could be made of FRP they would be much lighter and stiffer thus much easier and safer to handle, require less energy and time to accelerate and decelerate (due to lower inertia), and produce better products due to rigidity. Their surface, however, would not have adequate wear resistance and could not be engraved as is required for some printing applications.

A solution to many of the problems associated with the utilization of FRP would be an adherent coating with the required wear resistance or other properties. A wide variety of metallic, ceramic, cermet, and some polymeric coatings can be produced using thermal spray deposition. Many of these materials would be useful in providing wear resistance and other properties for FRP components if they could be successfully deposited on them.

The family of thermal spray processes includes Super D-Gun™ deposition, detonation gun deposition, high velocity oxy-fuel deposition and its variants such as high velocity air-fuel, plasma spray, flame spray, and electric wire arc spray. In most thermal coating processes, a metallic, ceramic, cermet, or some polymeric material in powder, wire, or rod form is heated to near or somewhat above its melting point and droplets of the material accelerated in a gas stream. The droplets are directed against the surface of the substrate (part or component) to be coated where they adhere and flow into thin lamellar particles called splats. The coating is built up of multiple splats overlapping and interlocking. These processes and the coatings they produce have been described in detail in the following: "Advanced Thermal Spray Deposition Techniques", R. C. Tucker, Jr., in *Handbook of Deposition Technologies for Films and Coatings*, R. F. Bunshah, ed., Second Edition, Noyes Publications, Park Ridge, N.J., 1994, pp. 591 to 642; "Thermal Spray Coatings", R. C. Tucker, Jr. in *Handbook of Thin Films Process Technology*, Institute of Physics Publishing, Ltd., London, 1995; and "Thermal Spray Coatings", R. C. Tucker, Jr., in *Surface Engineering, ASM Handbook*, Vol. 5, ASM International, Materials Park, Ohio, 1994, pp. 497-509.

In virtually all thermal spray processes, two of the most important parameters controlling the structure and properties of the coating are the temperature and the velocity of the individual particles as they impact on the surface to be coated. Of these, the temperature of the particles is of greatest import relative to coating FRPs. The temperature the particles achieve during the deposition process is a function of a number of parameters including the temperature and enthalpy (heat content) of the process gases, the specific mechanisms of heat transfer to the particles, the composition and thermal properties of the particles, the size and shape distributions of the particles, the mass flow rate of the particles relative to the gas flow rate, and the time of transit of the particles. The velocity the particles achieve is a function of a number of parameters as well, and some of these are the same as those that affect the particle temperature including the composition, velocity and flow rate of the gases, the size and shape distributions of the particles, the mass injection rate and density of the particles.

In a typical detonation gun deposition process, a mixture of oxygen and acetylene along with a pulse of powder of the coating material is injected into a barrel about 25 mm in diameter and over a meter long. The gas mixture is detonated, and the detonation wave moving down the barrel heats the powder to near or somewhat above its melting point and accelerates it to velocity of about 750 m/s. The powder's rapidly heated into molten, or nearly molten droplets of material that strike the surface of the substrate to be coated and flow into strongly bonded splats. After each detonation the barrel is purged with an inert gas such as nitrogen, and the process repeated many times a second. Detonation gun coatings typically have a porosity of less than two volume percent with very high cohesive strength as well as very high bond strength to the substrate. In the Super D-Gun™ coating process, the gas mixture includes other fuel gases in addition to acetylene. As a result there is an increase in the volume of the detonation gas products which increases the pressure and hence greatly increases the gas velocity. This, in turn, increases the coating material particle velocity, which may exceed 1000 m/s. The increased particle velocity results in an increase in coating bond strength, density, and an increase in coating compressive residual stress. In both the detonation gun and Super D-Gun coating processes nitrogen or another inert gas can be added to the detonation gas mixture to control the temperature of the detonated gas mixture and hence the powder temperature. The total process is complex, and a number of parameters can be used to control both the particle temperature and velocity, including the composition and flow rates of the gases into the gun.

In high velocity oxy-fuel and related coating processes oxygen, air, or another source of oxygen is used to burn a fuel such as hydrogen, propane, propylene, acetylene, or kerosene in a combustion chamber and the gaseous combustion products allowed to expand through a nozzle. The gas velocity may be supersonic. Powdered coating material is injected into the nozzle and heated to near or above its melting point and accelerated to a relatively high velocity, up to about 600 m/s for some coating systems. The temperature and velocity of the gas stream through the nozzle, and ultimately the powder particles, can be controlled by varying the composition and flow rate of the gases or liquids into the gun. The molten particles impinge on the surface to be coated and flow into fairly densely packed splats that are well bonded to the substrate and each other.

In the plasma spray coating process a gas is partially ionized by an electric arc as it flows around a tungsten cathode and through a relatively short converging then diverging nozzle. The partially ionized gas, or gas plasma, is usually based on argon, but may contain, for example, hydrogen, nitrogen, or helium. The temperature of the plasma at its core may exceed 30,000 K and the velocity of the gas may be supersonic. Coating material, usually in the form of powder, is injected into the gas plasma and is heated to near or above its melting point and accelerated to a velocity that may reach about 600 m/s. The rate of heat transfer to the coating material and the ultimate temperature of the coating material are a function of the flow rate and composition of the gas plasma as well as the torch design and powder injection technique. The molten particles are projected against the surface to be coated forming adherent splats.

In the flame spray coating process, oxygen and a fuel such as acetylene are combusted in a torch. Powder, wire, or rod is injected into the flame where it is melted and accelerated. Particle velocities may reach about 300 m/s. The maximum temperature of the gas and ultimately the coating material is a function of the flow rate and composition of the gases used and the torch design. Again, the molten particles are projected against the surface to be coated forming adherent splats.

Many attempts have been made to directly coat FRP surfaces with thermal spray coatings. Thermal spray coatings of metallic, cermet, or ceramic compositions usually do not adhere at all or spall when only a small amount of coating has been deposited. In most thermal spray coating applications, the surface to be coated must be roughened to provide adequate bonding. Roughening is usually done by grit blasting the surface. Grit blasting or some other forms of roughening FRP surfaces leads to unacceptable erosion of the polymeric matrix and fraying of the fibers. The later, in particular, leads to a rough and porous thermal spray coating. This and other problems were found in attempting the method of Hycner in U.S. Pat. No. 5,857,950 for example. Hycner teaches grit blasting the surface of a CFRP fluid metering roll (an anilox roll used in printing) and then thermal spraying a layer of zinc, nickel-20 chromium, or mixture of aluminum bronze plus 10 polyester at a negative rake angle of 11½° M to 13½ M degrees. A ceramic coating is then applied over the first layer. The ceramic coating is subsequently finished and engraved. This process has been found to be unacceptable because of poor bond strength with some of the specified first layer coatings and other production problems and because of substantial imperfections in the coating. Many other attempts to use thermally sprayed metallic undercoats have also failed. Even attempts to deposit an undercoat of a polymeric material by thermal spraying were only marginally successful in laboratory experiments and in production were difficult to reproduce in a reliable manner.

An alternative method has been taught by Habenicht in EP 0 514 640 B1. Habenicht first creates on the surface of a CFRP a layer that consists of a mixture of a synthetic resin that bonds to the CFRP and a particulate material. After this layer is cured the surface is partially removed to expose the particulate material. The particulate material must be capable of chemical bonding to the outer coating material that is thermally sprayed on the first layer. The particulate materials and the outer thermal spray coating material are selected from variety of metals and ceramics. While this method has met with limited success, the mixture of synthetic resin and particulate material may not bond well to the CFRP and tends to form balls of material on the surface, thus being unsuitable for commercial production.

Several other techniques of preparing the surface of a CFRP surface for thermal spray coatings have been described by E. Lugscheider, R. Mathesius, G. Spur, and A. Kranz in the Proceedings of the 1993 National Thermal Spray Conference, Anaheim, Calif., 7 to 11 Jun. 1993. One method appears to be similar to that of Habenicht, but the most successful method appeared to be one in which a three dimensional wire mat was laminated into the polymeric composite. The surface was then grit blasted to expose the wire and a thermal spray coating applied. This technique would be very expensive to use in industrial applications and would tend to yield a very rough surface on the thermal spray coating.

Thus the current state of the art is such that there appears to be no method of successfully depositing thermal spray materials of a wide variety of compositions on FRP in a production worthy manner.

It is an object of the present invention to provide a coating for fiber reinforced composite polymeric materials and components that are well bonded and have an exterior layer with high resistance to wear, corrosion or other unique properties not provided by the fiber reinforced composite materials.

It is further object of the present invention to provide a process for applying well bonded thermal spray coatings to fiber reinforced composite polymeric materials.

It is a particular object of the invention is to provide a thermal spray coating and a method of applying thermal spray coating to carbon fiber reinforced composite materials and components.

SUMMARY OF THE INVENTION

The invention is a coating for fiber reinforced composite materials. A first polymeric layer, free of fibers and particulate, coats a fiber reinforced polymer substrate. The first layer joins the fiber reinforced polymer substrate to a second polymeric layer-two different composites. The second polymeric layer contains a polymeric matrix and a particulate within the polymeric matrix. Finally, at least one thermally sprayed material coats the second polymeric layer to form an adherent multi-layer coating attached to the fiber reinforced polymer substrate.

The process of the invention applies a coating on a fiber reinforced composite material. It includes the steps of applying a first polymeric layer to a fiber reinforced polymer substrate. The first polymeric layer is free of fibers and particulate. Applying a second polymeric layer coats the first polymeric layer. The first polymeric layer acts as a bonding agent to join the fiber reinforced polymer substrate to the second polymeric layer. The second polymeric layer contains a polymeric matrix and a particulate within the polymeric matrix. Thermal spraying a material coats the second polymeric layer, with the first and second polymeric layers protecting the fiber reinforced polymer substrate during thermal spraying.

DESCRIPTION OF THE PREFERRED EMBODIMENTS

As noted above, it has been found that adequate thermal spray coatings on fiber reinforced composite materials can not be achieved using known methods. Surprisingly, it has been found that by applying a first layer comprising only polymeric materials and then a second layer comprising a mixture of polymeric and particulate materials, that one or more additional layers of thermal spray materials can be applied. It is necessary to judicially choose the polymeric materials in the two initial layers to achieve high bond strength between the first layer and the FRP and between the first and second layer. With an appropriate choice of materials, very well bonded coatings with no significant imperfections can be deposited.

The polymeric materials that may be used in either the polymeric first layer or as the polymeric material in the second layer comprising a mixture of polymeric and particulate materials include epoxies and thermosetting resins. The preferred polymeric materials are epoxies and the most preferred polymeric material is bisphenol F/epichlorohydrin epoxy resin (Shell Epon Resin 862) mean hydrogen equivalent weight of curing agent/epoxy equivalent weight of resin=20.7/170=0.1218 or 12.18 weight percent of curing agent diethylenetriamine (Epi-Cure 3223), a two part epoxy that cures at room temperature. The first polymeric layer remains free of fibers and particulate to ensure a strong bond to the FRP.

The surface of the FRP must be cleaned prior to the application of the first layer. Appropriate solvents may be used to remove any oils or other contaminants. It is preferred that the surface be roughened after it has been cleaned, preferably to a roughness of not less than 3.048 microns (120 microinches) Ra. Grit blasting can be used to accomplish the surface roughening. Residual debris and other contaminants can be removed by wiping with an appropriate solvent such as methanol or acetone.

A variety of methods may be used to apply the first layer of polymeric materials. The choice of method is dependent, in part, on the geometry of the surface to be coated and the composition and physical characteristics of the polymeric material. The methods include spreading the polymeric material on surface if it is sufficiently viscous, spraying atomized droplets of the materials using typical liquid spray dispensers or any other method of applying a liquid to a surface. Spreading a viscous material on the surface may be done manually or with an automated or semi-automated system. A doctor blade may be used to control the thickness of the layer. The polymeric material may be applied by spraying, if the viscosity is low enough or a diluent is added to the polymeric material to reduce its viscosity sufficiently to allow spraying. The preferred method is to spread the polymeric material on the surface as somewhat viscous material, most preferably using an automated or semi-automated method. If the surface to be coated is cylindrical in shape, the cylinder can be rotated and the polymeric material applied to the surface by feeding it onto a blade held parallel to an element of the cylinder surface and at a distance suitable to control the thickness of the layer. The polymeric material is then allowed to flow off of the blade surface onto the cylinder surface as a smooth sheet of uniform thickness. The thickness is thus controlled and no mist or overspray is released into the atmosphere as is the case in spraying. Preferably only a thin layer of the polymeric material is applied to the surface of the FRP, just sufficient to wet the surface. The preferred thickness of the layer comprising a polymeric layer is in the range of about 0.002 to 0.127 mm, with the most preferred range being about 0.005 to 0.076 mm.

The second layer of the coating system comprising a mixture of polymeric and particulate materials is usually applied over the first layer comprising a polymeric material before the first layer is cured; i.e., while the first layer is still tacky. Alternatively, the first layer comprising a polymeric material is cured after it is applied. If necessary, and a thick enough layer is applied, the cured first layer may be machined by grinding or other methods to smooth and adjust the thickness of the layer.

The particulate material in the second layer may be at least one material selected from the group consisting of metallics, cermets, and ceramics. Most advantageously, the particulate is at least one material selected of the groups consisting of: Group I, aluminum, nickel, iron, chromium, and cobalt; Group II, aluminum-base, nickel-base, iron-base, chromium-base, and cobalt-base alloys; Group III, aluminum, chromium, zirconium and silicon oxides; Group IV, aluminum, chromium, zirconium and silicon compounds; Group V, chromium, tungsten, boron, silicon carbides; and Group VI, boron and chromium nitrides. The size of the particulate material is dependent on the specific composition of the particulate material, but may be from essentially zero to about 500 μm (less than approximately 50 mesh). The preferred size for greater than 90% of the material for aluminum is −127/+78 μm screen size (−200/+325 mesh), for nickel is −149/+78 μm screen size (−170/+325 mesh), and for iron −318/+78 μm screen size (−80/+325 mesh). For other particulate materials, the preferred size is −318/+64 μm screen size (−80/+400 mesh). The amount of particulate material in the second layer is a function of the composition of the particulate material, the geometry of the component being coated, and the method of application as small changes in composition can change the viscosity of the mixture significantly. In weight percent, the preferred amount of particulate material is in the range of about 20 to 85, and the most preferred amount is in the range of about 60 to 80.

The second layer of the coating system comprising a mixture of a polymeric material and a particulate material may be applied by any of the methods described above for the first layer comprising a polymeric material. The method used for the first layer may be different than that used for the first layer, however, depending on the physical characteristics of the mixture. For example, the first layer may be sprayed and the second spread. Nonetheless, the preferred method for applying the second layer is by spreading manually or in an automated or semi-automated manner. If the surface to be coated is cylindrical in shape, the most preferred method is by feeding the mixture onto a blade held parallel to an element of the cylinder and at a distance suitable to control the thickness of the layer. The mixture is then allowed to flow off of the blade onto the cylinder surface as a smooth sheet of uniform thickness. The preferred thickness of the layer comprising a mixture of polymeric and particulate materials is in the range of about 0.05 to 3.2 mm, with the most preferred range being about 0.5 to 1.27 mm.

The second layer comprising a mixture of polymeric and particulate materials is cured after it is applied. If necessary, the cured second layer may be machined by grinding or other methods to smooth the surface and to adjust the thickness of the layer. The roughness of the surface of the second layer may then be optimized to increase the strength of the bond of the subsequently applied thermal spray coating to it. The preferred method of surface roughening is grit blasting. Preferably, grit blast parameters are chosen to obtain the maximum roughness without removing more than about a 0.025 mm thick layer of material from the surface.

One or more layers of thermal spray coatings are applied by any thermal spray method over the suitably prepared layer comprising a mixture of polymeric and particulate material. Although any thermal spray method may be used, the preferred method is plasma spray deposition. Metallic, ceramic, cermet, and some polymeric materials may be deposited by thermal spray. As noted above, the specific thermal spray coating material is selected based on the requirements of the service environment. Enhanced mechanical properties may be achieved by using two or more layers of thermal spray coatings of different compositions. For example, the first or inner thermal spray layer may be a metal or metal alloy such as nickel or a nickel-chromium alloy and the second or outer layer an oxide such as chromium oxide. Such a two layer thermal spray coating system may have a higher bond strength and greater resistance to impact damage than a single layer of chromium oxide. The thickness of the thermal spray coating layer or layers is dependent on the requirements of the service environment including the expected wear life and mechanical properties. The preferred thermal spray coating thickness range is about 0.05 to 0.5 mm. The preferred thickness range is about 0.05 to 0.25 mm for the initial metallic thermal spray coating when two or more thermal spray coating layers are used.

This invention is applicable to the coating of many articles manufactured using fiber reinforced composites to enhance the wear, corrosion, and other properties of their surfaces. Virtually any component geometry that can be coated using thermal spray technology (a line-of-sight deposition process) can be coated using the methods of this invention. Some of the most readily coated component surfaces are those that are either flat or cylindrical in shape. Cylinders are usually coated by rotating them about their axis and simultaneously applying the coatings by moving the spreading or spraying application along the length of the cylinder. Both the rate of rotation and the rate of traverse down the length of the cylinder are chosen to uniformly apply the coatings at a prescribed rate of deposition in one or more passes.

FRP cylinders of particular importance are rolls used in the printing and in the paper industry as noted in the background section herein. In the printing industry, anilox rolls are used to transport very precisely measured amounts of ink from a reservoir to the printing roll. Currently, the most advanced rolls of this type are made of metal with a plasma sprayed chromium oxide surface. The chromium oxide is first ground to a smooth surface and then engraved using a laser with very small holes. Ink is adsorbed on the surface as the roll rotates through a reservoir. The excess ink is scrapped from the surface by a doctor blade and then the remaining ink contained in the holes is transferred to the printing roll. The roll surface must be both resistant to corrosion by the ink and resist wear by the doctor blade. An ideal material for this application is chromium oxide. For the reasons noted in the background section, it would be highly advantageous to change from a metallic roll body to a carbon fiber reinforced polymeric composite roll body. After repeated unsuccessful trials using the various methods known in the art, it was found that the methods of this invention yielded a uniquely reproducible and production worthy coating system for this application.

The preferred coating system for anilox rolls consists of a first layer comprising an epoxy-based polymeric coating about 0.005 to 0.076 mm thick, a second layer comprising a mixture of an epoxy-based polymeric coating and a particulate material about 0.5 to 1.27 mm thick, a thermal spray coating layer of a metal or metal alloy about 0.05 to 0.25 mm thick, and a thermal spray coating of chromium oxide about 0.01 to 0.5 mm thick. The most preferred epoxy based polymeric material in both the first and second layer is bisphenol F/epichlorohydrin epoxy resin+12.18 weight percent diethylenetriamine. The preferred particulate material in the mixture of the second layer mixture is selected from the group consisting of metals, ceramics, and cermets. The most preferred particulate material in the mixture of the second layer is selected from the group comprising aluminum, aluminum alloys, nickel, nickel alloys, or iron alloys. The preferred amount of particulate material in weight percent in the mixture of polymeric and particulate materials in the second layer is about 20 to 85. The most preferred amount of particulate material in weight percent in the mixture of the second layer is about 58 to 64 for aluminum and about 71 to 77 for nickel. The preferred metal of the first thermal spray layer is selected from the group consisting of nickel, chromium, iron, zinc, and their alloys. The most preferred metal of the first thermal spray layer is selected from a group consisting of nickel and nickel alloys. The preferred method of applying the polymeric layer and the layer comprising a mixture of polymeric and particulate materials is by spreading. The preferred thermal spray process for both the metallic and chromium oxide layers is plasma spray deposition.

FRP rolls for use in the paper industry may be coated in a manner similar to that used for anilox rolls as described above, but with an alumina-based outer coating rather than chromia-based. For these applications, the alumina is not usually laser engraved.

The following examples are provided below to illustrate the invention, but are not intended to demonstrate the full scope of the invention or limit its applicability in any way. Examples 1 to 6 represent comparative examples outside the scope of the invention.

EXAMPLE 1

Many attempts were made to coat several types of carbon fiber and glass fiber reinforced composite materials directly with plasma sprayed chromium oxide and with plasma sprayed nickel coatings. The surfaces were roughened to varying degrees by grit blasting and the deposition parameters were varied, but without success. Virtually no deposition of chromium oxide was achieved and the coverage achieved with nickel was incomplete and the carbon fibers flared even more than after grit blasting. A few samples were coated with a first layer of nickel about 0.25 mm thick followed by a second layer of chromium oxide. The bond strength of some of these nickel/chromium oxide coatings to CFRP was measured using a modified American Society for Testing and Materials tensile bond test designed for thermal spray coatings. The maximum bond strength achieved was 1,100 psi (7.6 MPa) when the chromium oxide layer was 0.175 mm thick, diminishing to near zero when the chromium oxide layer was 0.300 mm thick. These values are unacceptable for service use.

EXAMPLE 2

An attempt was made to coat a carbon fiber reinforced composite with a diluted epoxy based material prior to attempting to deposit chromium oxide or nickel by plasma spraying. Virtually no chromium oxide was deposited whether it was plasma sprayed while the epoxy-based layer was still tacky or completely cured.

EXAMPLE 3

Carbon fiber reinforced composites samples were electroplated with nickel greater than 0.5 mm thick and then ground to about 0.175 to 0.200 mm thick. Nickel coatings about 0.125 mm thick were also produced. Both were successfully over-coated with plasma sprayed chromium oxide. An electroplated nickel coating about 0.125 mm thick was tested; but it spalled when a plasma sprayed chromium oxide was applied over it. While this approach to coating CFRP appeared to be somewhat successful, its reproducibility is questioned. Furthermore, this process requires an electroplating facility and it would be very expensive to apply to large components.

EXAMPLE 4

Carbon fiber reinforced composite samples were coated with resin-bonded hollow microspheres which were then ground to open the hollow spheres to provide cavities for bonding a second coating. Some of the samples were then over-coated with plasma sprayed stainless steel. An attempt was then made to coat these samples with plasma sprayed chromium oxide. The underlying resin bonded microsphere coating spalled in all cases.

EXAMPLE 5

Carbon fiber reinforced composite samples were obtained that had a white gel (resin) overcoat. These samples could be coated with a plasma sprayed chromium oxide, but it was found that the chromium oxide coating had many pinholes and small areas with no chromium oxide coating. In addition, the white gel process was difficult to use in production because of the excessive amount of diluent, methyl ethyl ketone that evolved during spraying resulting in: 1) creating a potential health and fire hazard; 2) difficulty in obtaining a uniform coating; and 3) difficulty in maintaining its uniformity while the coating was cured.

EXAMPLE 6

A series of experimental CFRP samples and prototype rolls were coated with the following procedure. Process parameters were optimized for each step in the procedure.

The CFRP was cleaned and then roughened by grit blasting with 60 mesh aluminum oxide grit at 20 psi and a 152 mm standoff to a surface roughness of greater than 0.003048 mm (120 microinches) Ra. The surface was then wiped with methanol or acetone.

A mixture of an epoxy and either aluminum or nickel was produced. The epoxy was a mixture of bisphenol F/epichlorohydrin (Shell Epon 862)+12.18 weight percent diethylenetriamine (Shell Epi-Cure 3223). In the case of aluminum, the mixture was 60 to 62 weight percent aluminum. In the case of nickel, the mixture was 73 to 75 weight percent nickel. The metal powders were nominally less than 44 microns in size. The viscosity changes significantly within the composition ranges given, and the specific ratio used was chosen for ease of application on a specific sample or component. Great care was taken to avoid introducing air into the mixture while blending the epoxy with the metal powder. A number of attempts were made to spread the mixture on the sample or component using techniques described above. None of these attempts were successful.

EXAMPLE 7

It was surprisingly found that the addition of a thin layer of polymeric material on the FRP surface served to enhance the bond strength and the reliability of the coatings. The following illustrates the coating materials and processes used to successfully coat both laboratory samples and production prototype anilox rolls made of carbon fiber reinforced composite materials.

The CFRP was cleaned and then roughened by grit blasting with 60 mesh (–423 μm screen size) aluminum oxide grit at 20 psi (138 kPa) and a 152 mm standoff to a surface roughness of greater than 0.003048 mm (120 microinches) Ra. The surface was then wiped with methanol or acetone.

A thin layer of epoxy was then applied to a thickness of 0.005 to 0.025 mm. The epoxy was a mixture of bisphenol F/epichlorohydrin (Shell Epon 862)+12.18 weight percent diethylenetriamine (Shell Epi-Cure 3223). The epoxy was applied smoothly to the sample or roll surface shortly (less than 20 min.) before the mixture of epoxy plus aluminum was applied.

A mixture of the same epoxy as in (b) above and either aluminum or nickel was produced. In the case of aluminum, the mixture was 60 to 62 weight percent aluminum. In the case of nickel, the mixture was 73 to 75 weight percent nickel. The metal powders were nominally less than 44 microns in size. The viscosity changes significantly within the composition ranges given, and the specific ratio used was chosen for ease of application on a specific sample or component. Great care was taken to avoid introducing air into the mixture while blending the epoxy with the metal powder. The mixture was spread on the sample or component using a technique described above to a thickness of about 0.500 mm.

The epoxy and epoxy/metal mixture was allowed to cure for at least three hours and then single point machined to a thickness of about 0.300 mm.

After at least 36 hours from the time the epoxy/metal mixture was applied, the surface can be roughened by grit blasting using 60 mesh (423 μm screen size) aluminum oxide grit at 20 psi (138 kPa) with a 150 mm standoff to a surface roughness of about 0.00508 to 0.00635 mm (200 to 250 microinches) Ra.

Optionally, a plasma deposited nickel coating was then applied to a thickness of about 0.125 mm.

A plasma deposited chromium oxide coating was applied to a thickness of about 0.300.

For a prototype anilox roll, the chromium oxide coating was ground to a smooth surface and then laser engraved.

All of the samples prepared by this procedure were very acceptable. No significant surface imperfections were observed. The bond strengths of the coating systems with and without the optional plasma sprayed layer were measured using a modified recommended procedure of the American Society for Testing and Materials. A tensile bond strength of 3010 psi (20.8 MPa) was measured with the nickel layer and 3200 psi (22.1 MPa) without the nickel layer. Thus the bond strength for either was more than adequate for the intended service as an anilox roll. The multi-layer structure readily achieves the 10 MPa tensile strength required for most commercial applications.

The process readily coats cylindrical rolls constructed with fiber reinforced polymer substrates such as CRFPs. First applying the two polymeric layers to a cylindrical roll's outside cylindrical surface and then thermally spraying this surface creates the multi-layer coating that effectively covers and protects the roll's working surface. This is particularly effective for articles of manufacture such as fluid metering rolls, rolls used in the production of paper and rolls used in film processing.

The multi-layered structure provides an effective coating for fiber reinforced composite polymeric materials and components. These coatings are well bonded and have an exterior layer with high resistance to wear, corrosion or other unique properties not provided by the fiber reinforced composite materials per se. In addition, it provides an improved process for applying well bonded thermal spray coatings to fiber reinforced composite polymeric materials and in particular to carbon fiber reinforced composite materials and components.

Many possible embodiments may be made of this invention without departing from the scope thereof, it is understood therefore that all matter set forth herein is to be interpreted as illustrative and not in a limiting sense.

What is claimed is:

1. A process of applying a coating on a fiber reinforced composite material comprising the steps of:
   a) applying a first polymeric layer to a fiber reinforced polymer substrate, the first polymeric layer being free of fibers and particulate;
   b) applying a second polymeric layer coating to the first polymeric layer to join the fiber reinforced polymer substrate to the second polymeric layer using the first polymeric layer as a bonding agent, the second polymeric layer comprising a polymeric matrix and a particulate within the polymeric matrix, wherein the second polymeric layer contains about 20 to 85 weight percent particulate and wherein the particulate in the second polymeric layer is a metal; and
   c) thermal spraying a material to coat the second polymeric layer to form an adherent multi-layer coating attached to the fiber reinforced polymer substrate, the multi-layer coating being attached to the fiber reinforced polymer substrate with a tensile strength of at least about 10 MPa.

2. The process of claim 1 including the additional steps of roughening the surface of the fiber reinforced composite substrate before applying the first polymeric layer; and roughening the surface of the second polymeric layer before thermal spraying the material onto the second polymeric layer.

3. The process of claim 1 wherein the fiber reinforced polymer substrate is a cylindrical roll having an outside diameter surface and the applying the first polymeric layer consists of coating the outside cylindrical surface of the cylindrical roll.

4. The process of claim 1 wherein the first and second polymeric layers are a bisphenol F/epichlorohydrin+diethylenetriamine, the particulate material in the second polymeric layer is aluminum or nickel, and the thermally sprayed material is a single layer of chromium oxide or a multi-layer consisting of an inner nickel layer and an outer chromium oxide layer.

5. The process of claim 1 wherein the first polymeric layer is a material selected from the group consisting of epoxy and thermosetting resins.

6. The process of claim 1 wherein the first polymeric layer is a two component epoxy resin of bisphenol F-type epichlorohydrin and diethylenetriamine.

7. The process of claim 1 wherein the metal is a material selected from at least one of the following groups: Group I, aluminum, nickel, iron, chromium, and cobalt;
   Group II, aluminum-base, nickel-base, iron-base, chromium-base, and cobalt-base alloys;
   Group III, aluminum, chromium and zirconium oxides;
   Group IV, aluminum, chromium, and zirconium compounds.

8. The process of claim 1 wherein the second polymeric layer contains about 60 to 80 weight percent particulate.

9. The process of claim 1 wherein the size of the particulate material in the second layer is less than about 500 µm.

10. The process of claim 1 wherein the first polymeric layer has a thickness of about 0.002 to 0.127 mm and the second polymeric layer has a thickness of about 0.050 to 3.2 mm.

11. A process of appplying a coating on a fiber reinforced composite material comprising the steps of:
    a) applying a first epoxy layer to a fiber reinforced polymer substrate, the first epoxy layer being free of fibers and particulate;
    b) applying a second epoxy layer coating to the first epoxy layer to join the fiber reinforced polymer substrate to the second epoxy layer using the first epoxy layer as a bonding agent, the second epoxy layer comprising an epoxy matrix and a particulate within the epoxy matrix, wherein the second epoxy layer contains about 20 to 85 weight percent particulate and wherein the particulate in the second epoxy layer is a metal; and
    c) thermal spraying a material to coat the second epoxy layer to form an adherent multi-layer coating attached to the fiber reinforced polymer substrate, the multi-layer coating being attached to the fiber reinforced polymer substrate with a tensile strength of at least about 10 MPa.

12. The process of claim 11 wherein the first epoxy layer has a thickness of about 0.005 to 0.076 mm and the second epoxy layer has a thickness of about 0.5 to 1.27 mm.

13. The process of claim 12 wherein the first and second epoxy material is a bisphenol F-type epichlorohydrin and diethylenetriamine, the particulate material in the second epoxy layer is aluminum or nickel, and the thermally sprayed material is chromium oxide or nickellchromium oxide with the chromium oxide coating the nickel.

14. The process of claim 13 wherein the fiber reinforced polymer substrate contains carbon fibers.

15. The process of claim 14 wherein the fiber reinforced polymer substrate is a cylindrical roll having an outside cylindrical surface and the multi-layer coating covers the outside diameter surface of the cylindrical roll.

16. The process of claim 15 wherein the cylindrical roll consists of an article of manufacture selected from the group consisting of fluid metering rolls, rolls used in the production of paper and rolls used in film processing.

* * * * *